(12) United States Patent
Svagin et al.

(10) Patent No.: US 8,680,006 B2
(45) Date of Patent: Mar. 25, 2014

(54) SATURATION OF AMMONIA STORAGE MATERIALS IN CONTAINERS

(75) Inventors: Jakob Svagin, Frederiksberg (DK); Ulrich Quaade, Bagsvaerd (DK); Ryan Bradley, Soborg (DK); Johnny Johansen, Copenhagen (DK); Henning Schmidt, Dyssegard (DK); Tue Johannessen, Glostrup (DK)

(73) Assignee: Amminex Emissions Technology A/S, Soborg (DK)

( * ) Notice: Subject to any disclaimer, the term of this patent is extended or adjusted under 35 U.S.C. 154(b) by 460 days.

(21) Appl. No.: 13/061,561

(22) PCT Filed: Sep. 7, 2009

(86) PCT No.: PCT/EP2009/006470
§ 371 (c)(1),
(2), (4) Date: May 24, 2011

(87) PCT Pub. No.: WO2010/025947
PCT Pub. Date: Mar. 11, 2010

(65) Prior Publication Data
US 2011/0236294 A1    Sep. 29, 2011

Related U.S. Application Data

(60) Provisional application No. 61/103,304, filed on Oct. 7, 2008.

(30) Foreign Application Priority Data

Sep. 8, 2008 (EP) ...................................... 08015788

(51) Int. Cl.
*B01J 20/00* (2006.01)

(52) U.S. Cl.
USPC ............................ 502/414; 502/515; 502/526

(58) Field of Classification Search
USPC ......................... 502/414, 515, 526
See application file for complete search history.

(56) References Cited

U.S. PATENT DOCUMENTS

| | | | |
|---|---|---|---|
| 2,019,356 A | 10/1935 | Berzelius | |
| 4,439,994 A | 4/1984 | Briley | |
| 5,384,101 A | 1/1995 | Rockenfeller | |
| 5,441,716 A | 8/1995 | Rockenfeller | |
| 5,728,368 A | 3/1998 | Bou et al. | |
| 5,875,648 A | 3/1999 | Boye et al. | |

FOREIGN PATENT DOCUMENTS

| | | |
|---|---|---|
| GB | 417 044 | 9/1934 |
| WO | WO 99/01205 | 1/1999 |
| WO | WO 2006/012903 | 2/2006 |
| WO | WO 2006/081824 | 8/2006 |

OTHER PUBLICATIONS

Anonymus, "VDI-Wärmeatlas," VDI Verlag, Dusseldorf, Germany (1994).
International Search Report dated Oct. 23, 2009 for Application No. PCT/EP2009/006470.
International Search Report dated Nov. 3, 2009 for Application No. PCT/EP2009/006471.
Johannessen, T. et al., "Ammonia Storage and Delivery Systems for Automative NOx Aftertreatment," SAE Technical Paper Series, vol. SP-2154(2008-01-1027) (Apr. 14, 2008) pp. 1-8.
Lopez, J. et al., "Composites graphite/sel pour le stockage d'énergie à haute température: etude des effets du graphite et de la microstructure des composites sur les propriétés de changement de phase des sels," C.R. Mecanique, vol. 336(7) (Jun. 3, 2008) pp. 578-585.
Mauren, S. et al., "Optimisation des densités énergétiques de systems de stockage chimique bases sur des réactions solide-gaz renversables," Revue De Physique Appliquee (Jan. 1, 1983) pp. 107-112.
Sörensen, J.S. et al., Reversible High-Density Hydrogen Storage in Compact Metal Ammine Salts, J. Am. Chem. Soc., vol. 130(27) (Jun. 13, 2008) pp. 8660-8668. http://pubs.acs.org/doi/pdf/10.1021/ja076762c
Uher, C., Landolt-Börnstein—Group III Condensed Matter, Numerical Data and functional Relationships in Science and Technology Thermal Conductivity of Pure Metals and Alloys, pp. 431-439.
Wang, K. et al., "Effective thermal conductivity of expanded graphite-$CaCl_2$ composite absorbent for chemical adsorption chillers," Energy Conversion and Management, vol. 47 (2006) pp. 1902-1912.
Written Opinion dated Aug. 3, 2011 for Application No. PCT/EP2009/006470.
Written Opinion dated Mar. 11, 2009 for Application No. PCT/EP/2009/006471.

*Primary Examiner* — Edward Johnson
(74) *Attorney, Agent, or Firm* — Frost Brown Todd LLC

(57) ABSTRACT

A method of saturating reversible ammonia storage materials inside a container for the purpose of achieving high volumetric ammonia storage capacity and containers filled with the materials are disclosed.

20 Claims, 10 Drawing Sheets

Fig. 2

ROTATIONAL DENSITY ADJUSTMENT

"DRUM" (OR CYLINDER) IS CONNECTED TO $NH_3(g)$
SUPPLY LINE WHILE ROTATING

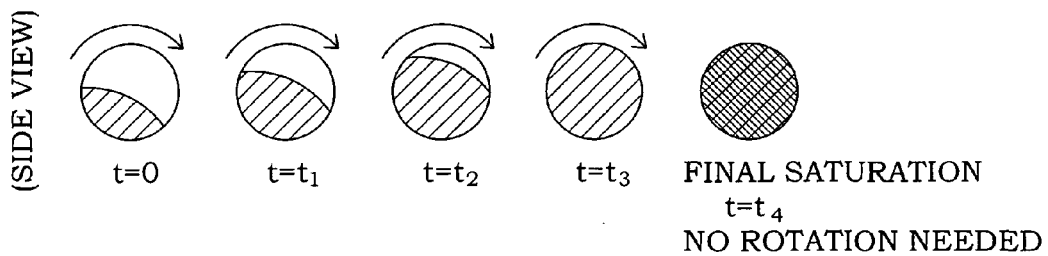

(SIDE VIEW)

$t=0$    $t=t_1$    $t=t_2$    $t=t_3$    FINAL SATURATION
                                                     $t=t_4$
                                           NO ROTATION NEEDED $t=0$ : UNSATURATED SALT (PARTLY FILLING THE CONTAINER)

$t=t_3$ : PARTLY SATURATED SALT FILLS THE CONTAINER BUT THERE IS SIGNIFICANT PORE VOLUME. HOMOGENEOUS DISTRIBUTION.

$t=t_4$ : COMPLETE SATURATION AND SELFCOMPACTION. ALMOST NO INTERNAL PORE VOLUME AT THE END.

SATURATION OF AMMONIA STORAGE MATERIALS IN CONTAINERS

This application is related to and claims priority from U.S. Provisional Patent Application Ser. No. 61/103,304, filed Oct. 7, 2008, incorporated herein by reference.

FIELD OF THE INVENTION

The invention relates to a method of saturating reversible ammonia storage materials inside a container for the purpose of achieving high volumetric ammonia storage capacity, and to containers filled with the materials.

DESCRIPTION OF RELATED ART

The use of metal ammine complexes for absorption/desorption of ammonia (e.g. $MgCl_2 + 6NH_3 \rightarrow Mg(NH_3)_6Cl_2(s)$) have mainly been applied in two technical fields.

The first technical field is refrigerating processes (e.g. Rockenfeller, U.S. Pat. No. 5,441,716). The heat of absorption/desorption can be used to transport heat from one place to another (endothermic desorption in one unit and exothermic absorption in another unit).

In the second technical field, metal ammine complexes are employed as an ammonia storage material for the controlled delivery of ammonia in e.g. mobile applications. Examples of such mobile applications are ammonia storage systems for NOx reduction from combustion engine exhaust, where an SCR catalyst (Selective Catalytic Reduction) converts dosed ammonia and NOx to $N_2$ and $H_2O$, (see e.g. WO 99/01205 (Robert Bosch GmbH) and applicant's co-pending applications WO2006/012903 and WO2006/081824) and ammonia storage systems in energy storage cartridges for fuel cell applications.

The present invention relates to a new in-situ saturation method wherein a controlled self compaction process is used to prepare ammonia storage cartridges with high volumetric storage capacity, high degree of homogeneity and high degree of saturation.

SUMMARY OF THE INVENTION

Most reversible storage materials in their unsaturated form, usually plain salts that can undergo complexation with ammonia, e.g. calcium chloride, expand when they absorb ammonia. Thus, before a storage material is saturated with ammonia in a container, it generally fills only part of the void inside the container. When ammonia is supplied for saturation, the material absorbs ammonia in an uneven manner depending on the geometry of the container and the localized efficiency of absorption heat dissipation to the surroundings. Normally, the material closest to the wall is saturated first, and this results in non-uniform conditions in the storage material. Further, since the container is only partly filled to start, large quantities of material have to move inside the container until the initial void region is filled. Even if the storage material is initially in the form of a powder or granulate, the forces exerted by these material movements can be very high and cause deformation of the container. This is highly undesirable.

An example of this challenge is a partially filled bottle of water that freezes. The free volume of the bottle may be large enough to theoretically accommodate the ice, but the isotropic expansion will break the bottle in the section initially filled with water before the ice moves upwards to fill the bottle's neck completely.

In industrially relevant methods of producing ammonia storage cartridges, the raw unsaturated material, usually an unsaturated salt, is easiest to handle if it is in the form of granules or powder with a sufficient grain size to enable transport in e.g. conveyers and silos. When the unsaturated salt is present as granules or powder of suitable grain size, the filling of such material into cartridges is subject to the relationship between possible saturation degree and the salt load of the container as shown FIG. 1. If the container is completely filled with unsaturated granules or powder and full saturation is desired, there will be more salt included than the allowable maximum load. As can be seen in the figure, there is an optimum (maximum) salt load of the container where full saturation is possible.

The storage material in the container in its saturated form has a well-defined maximum density defined by its lattice spacing, as if the material was present as one single crystalline block of saturated material. If a given internal volume in a container initially contains more (non-saturated) salt than the corresponding theoretical maximum (defined by a single crystalline block), then there is not enough room for saturating the salt within this volume completely—or in other words, the material would have to deform and expand the container to accommodate full saturation and increase in molar volume of the storage material. The alternative to cartridge deformation in this situation is incomplete saturation to fill the available volume exactly, which wastes storage volume with unsaturated salt and results in reduced ammonia storage capacity.

On the other hand, if significantly less then the theoretical maximum loading of salt was placed in the container, then full saturation of the material would occur but not fill the container. Thus, the ammonia capacity would be less than optimal (fewer moles of saturated salt than possible in a completely filled container).

The present invention solves the problem of getting a very high in-situ saturation and associated high volumetric ammonia storage capacity by self-compaction, while avoiding mechanical damage to the container and ensuring the necessary high degree of homogeneity in the container. In addition, it enables efficient use of raw materials such as granules or powder with rather large grain size.

In one aspect the invention provides a method for obtaining an ammonia storage material, which can reversibly absorb and desorb ammonia, wherein the material can be in unsaturated form void of ammonia, in partially saturated form where the average saturation with ammonia is less than the saturation obtained when the material has absorbed ammonia in the maximum theoretical amount, and in fully saturated form where the material has absorbed ammonia in the maximum theoretical amount, in a container comprising a container volume with a degree of saturation with ammonia corresponding to at least about 75% of the theoretical maximum ammonia storage capacity of said ammonia storage material in said container volume the method comprising:

a) providing said container comprising said container volume, wherein said container volume is filled with a granular or powdered form or a coherent or semi-coherent porous form of said partially saturated ammonia storage material in a molar amount that corresponds to at least about 75% of the molar amount of the fully saturated material, which would fill the container volume completely in the form of a single crystal; said partial saturation corresponding to a saturation of the storage material with ammonia to such a degree that the bulk volume of the partially saturated storage material under ambient pressure essentially equals the container volume;

b) further saturating said partially saturated ammonia storage material with ammonia to a desired degree of saturation corresponding to at least about 75% of the theoretical maximum ammonia storage capacity of said ammonia storage material in said container volume without agitation.

In one embodiment the providing of said container in step a) above comprises:

a') providing a molar amount of an unsaturated granular or powdered ammonia storage material void of ammonia, which is equal to at least about 75% of said molar amount of the fully saturated material, outside the container;

b') optionally filling the material provided in a') into the container;

c') obtaining a granular or powdered ammonia storage material which is partially saturated with ammonia to such a degree that its bulk volume essentially equals the container volume under ambient pressure, from the granular or powdered ammonia storage material provided in a') or b'), the material being agitated when said obtaining is accomplished inside the container;

d') filling the container volume completely with the partially saturated material, if obtained outside the container, e') and optionally further supplying ammonia with agitation, until the partially saturated material is a coherent or semi-coherent porous material.

In another aspect the invention provides a method for obtaining an ammonia storage material, which can reversibly absorb and desorb ammonia, wherein the material can be in unsaturated form void of ammonia, partially saturated form wherein the average saturation with ammonia is less than the saturation obtained when the material has absorbed ammonia in the maximum theoretical amount, and fully saturated form wherein the material has absorbed ammonia in the maximum theoretical amount, in a container comprising a container volume, comprising a) providing said container;

b) providing an unsaturated granular or powdered ammonia storage material void of ammonia in a molar amount, which is equal to at least about 75% the molar amount of fully saturated material, which would fill the container volume completely in form of a single crystal, outside the container;

c) optionally filling the material provided in b) into the container;

d) obtaining a granular or powdered ammonia storage material which is partially saturated with ammonia to such a degree that its bulk volume essentially equals the container volume, from the granular or powdered ammonia storage material provided in b) or c) under ambient pressure, the material being agitated when said obtaining is accomplished inside the container;

e) filling the container volume completely with the partially saturated material, if obtained outside the container, f) and optionally further supplying ammonia with agitation, until the partially saturated material is a coherent or semi-coherent porous material.

In a further aspect the invention provides a container comprising a container volume filled with an ammonia storage material, which reversibly absorbs and desorbs ammonia, with a degree of saturation under ambient pressure corresponding to at least about 75% of theoretical maximum ammonia storage capacity of said ammonia storage material in said container volume, wherein said ammonia storage material is in a coherent or semi-coherent form.

In yet another aspect, the invention provides a container of an arbitrary shape comprising a container volume filled with a partially saturated ammonia storage material, which reversibly absorbs and desorbs ammonia, said filled container volume being obtainable by a) providing an unsaturated granular ammonia storage material void of ammonia in a molar amount, which is equal to at least about 75% of the molar amount of fully saturated material, which would fill the container volume completely in form of a single crystal, outside the container ;

b) optionally filling the material provided in a) into the container volume;

c) obtaining a granular ammonia storage material which is partially saturated with ammonia to such a degree that its bulk volume essentially equals the container volume, from the granular ammonia storage material provided in a) or b) under ambient pressure, the material being agitated when said obtaining is accomplished inside the container;

d) completely filling the container volume with the partially saturated material, if obtained outside the container.

BRIEF DESCRIPTION OF THE DRAWINGS

FIG. 2 is a schematic representation of the progress of the saturation of an ammonia storage material in a rotating drum.

DESCRIPTION OF THE EMBODIMENTS

Figure 1:
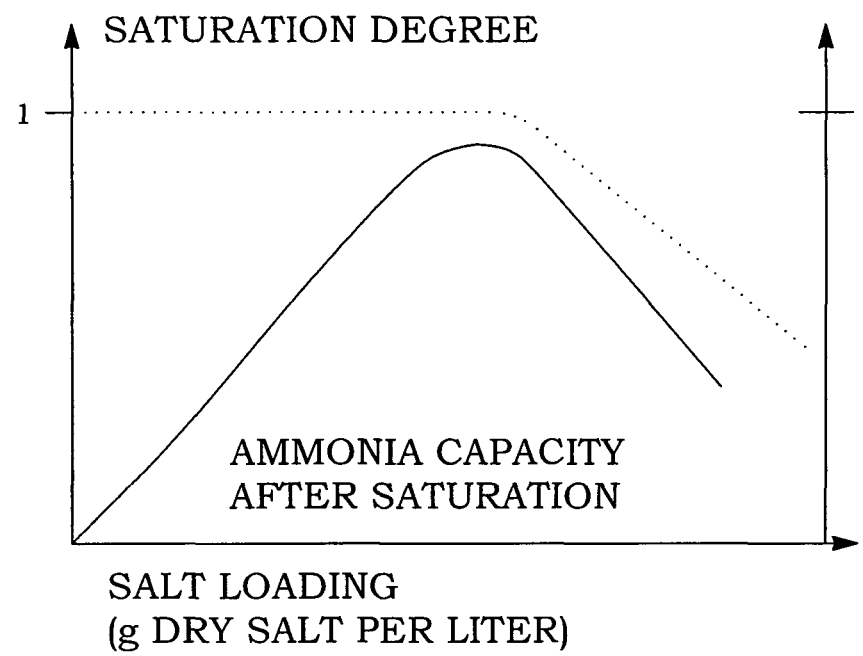
FIG. 1 is a graph showing the dependence of the ammonia capacity and saturation degree of an ammonia storage material on salt loading.

At first some definitions are given for terms used in the description and the appended claims.

An ammonia storage material, which can reversibly absorb and desorb ammonia, may be any material capable of performing this function. In some embodiments, the storage material is a metal salt undergoing a complexation with ammonia when exposed thereto, thereby forming a metal ammine complex salt.

In some embodiments the metal ammine complex salt is selected from metal ammine complex salts of the general formula: $M_a(NH_3)_nX_z$, wherein M is one or more cations selected from alkali metals such as Li, Na, K or Cs, alkaline earth metals such as Mg, Ca, Sr or Ba, and/or transition metals such as V, Cr, Mn, Fe, Co, Ni, Cu, or Zn or combinations thereof such as $NaAl$, $KA_1$, $K_2Zn$, $CsCu$, or $K_2Fe$; X is one or more anions selected from fluoride, chloride, bromide, iodide, nitrate, thiocyanate, sulphate, molybdate, and phosphate ions; a is the number of cations per salt molecule; z is the number of anions per salt molecule; and n is the coordination number of 2 to 12.

In some embodiments the metal ammine complex salt in its fully saturated form is $Mg(NH_3)_6Cl_2$, $Ca(NH_3)_8Cl_2$, $Sr(NH_3)_8Cl_2$ or a combination thereof.

The ammonia storage materials can be in unsaturated form void of ammonia, partially saturated form wherein the average saturation with ammonia (or the average amount of ammonia absorbed) is less than the saturation obtained when the material has absorbed ammonia in the maximum theoretical amount, and fully saturated form wherein the material has absorbed ammonia in the maximum theoretical amount.

An example of an unsaturated form of an ammonia storage material is dry $CaCl_2$. In a partially saturated form, this material could have an average formula of $Ca(NH_3)_4Cl_2$ (average means average of the formulae of all molecules present, e.g. from $CaCl_2$ to $Ca(NH_3)_8Cl_2$). In its fully saturated form (maximum possible complexation with ammonia) this material has the formula $Ca(NH_3)_8Cl_2$.

The degree of saturation may be expressed in percent. For example, partially saturated calcium chloride having a saturation degree of 75% corresponds to an average formula of $Ca(NH_3)_6Cl_2$. The result would often be a fractional index of $(NH_3)$. A fractional index of $(NH_3)_x$, e.g. $(NH_3)_{4.3}$, denotes an average number of ammonia molecules per molecule which must, of course, be an integer in each particular molecule. The degree of saturation of a known amount of material can be determined by the amount of ammonia uptake by the salt.

In some embodiments the unsaturated ammonia storage material is mixed with one or more additives not capable of storing ammonia and having a thermal conductivity higher then that of the ammonia storage material at a temperature of from −45° C. to 250° C., so as to provide a better heat transport. Preferably the thermal conductivity of the additive is at least five times higher, more preferably at least ten times higher than that of the ammonia storage material at a temperature of from at least −45° C. to 250° C.

Preferably the material is non-reactive with ammonia, however, a superficial passivating reaction with ammonia is also acceptable.

Besides having a thermal conductivity higher than that of the ammonia storage material the additive advantageously should mix well with the ammonia storage material and have a lubricating effect between grain boundaries of the ammonia storage material thus improving grain boundary mobility during partial saturation, while having a stiction effect between grains, once the ammonia storage material is compacted to a coherent mass. By this, the compacted material will have an improved mechanical stability.

Non-limiting examples of these additives are metals, semiconductors, oxides, certain insulators such as silicon carbide, carbon fibers, carbon, graphite and other carbon modifications such as synthetic diamond, fullerenes and carbon nanotubes, and thermally conductive (co)polymers or (co)polymer blends with non-polymeric materials. Specific non-limiting examples are silicon, aluminum, aluminum oxide, carbon, carbon fibers, graphite and other carbon modifications, such as fullerenes and carbon nanotubes. Aluminum, graphite and carbon fibers are preferred. Aluminum is particularly preferred.

Furthermore, it was recognized that shapes of material other than fibers are sometimes more useful for improving mechanical properties, and therefore shapes other than fibers are often preferred, with the exception of carbon fibers which are a preferred form of an additive, since this specific fiber based on its very good lubricating properties and thermal conductivity is particularly suitable for the present invention.

The additive may be added in the form of e.g. powder, flakes, fibers, wires, platelets etc. The forms of the additive and ammonia storage material are preferably chosen such that the materials mix well and do not segregate over the time upon mechanical disturbance. For example, $CaCl_2$ and aluminium powder may be mixed in any ratio, and $CaCl_2$ granules or pellets having a diameter of e.g. 0.5-10 mm and aluminium powder mix well up to about 10% aluminium powder, whereas they do not mix well with aluminium flakes or granules.

The above-mentioned additive improves the flow characteristics of the unsaturated ammonia storage material resulting in easier handling, and also of the material during partial saturation. Furthermore it improves the ability for compaction giving higher densities and ammonia storage capacity of the ammonia storage material: The thermal conductivity of the mixture of additive and ammonia storage material is improved giving a lower response time during heating and cooling and the structural stability of the material after ammonia depletion (degassing) is enhanced, which facilitates the resaturation of the ammonia-depleted storage material contained in a container, since the material does not tend to break into pieces upon degassing.

The container as herein used may be of an arbitrary shape, i.e. of any shape desired and useful for the purposes of the invention.

The "container volume", as the term is used herein, may be only a part meant to be filled of the total container volume. This part may be separated from the rest of the total container volume by a gas permeable structure, e.g. a screen or perforated plate. The volume of objects, including the abovementioned additional substances enclosed in the container, other than the ammonia storage material are not included in the container volume.

The term "the container volume is filled" is meant to describe a state of the container where it is filled in such a way that the material in the container cannot be shifted around and where without using force essentially no further ammonia storage material as used for initially filling the container can be filled into it.

The term "theoretical maximum ammonia storage capacity of a storage material in a container volume" is the amount of ammonia that can be stored by a particular storage material in a particular container volume when said container volume is completely filled by a single crystal of the ammonia storage material in fully saturated form.

In the process of preparing efficient reversible ammonia storage cartridges, a container is loaded with an amount of ammonia storage material capable of storing ammonia reversibly (e.g. an inorganic salt that forms a metal ammine complex, such as dry $MgCl_2$, $CaCl_2$ or $SrCl_2$).

The present invention assures that the storage material is partially saturated and distributed as homogeneously as possible, and at the same time, fills the container volume completely (i.e. the material cannot be shifted around in the container) before it is saturated to the desired degree. The material can be present as a porous material in coherent or semi-coherent form or a granular or powdered form with sufficient interstices therein which leave enough space for a further expansion of the material upon further saturation By "coherent" is meant that the material would remain a single mass, if the container walls were removed. By "semi-coherent" is meant that the material might break into pieces, if the container walls were removed, but not disintegrate into a powder or granular form. The term "porous" includes microporous, meso-porous and macro-porous, as is understood by a person skilled in the art.

By assuring that the material with adjusted bulk density and, thus, bulk volume fills the container volume completely before the final saturation step, the need for movement of material inside the cartridge during the final saturation (and self-compaction) step is minimized. On a local material grain scale, there is sufficient porosity or interstices available for expansion during the saturation process. Thus, one can obtain a very high storage density and a minimal risk for deformation of the container when further saturating the storage material to the desired degree.

In order to reach the maximum possible ammonia storage capacity, the molar amount of partially saturated material present in the container must essentially correspond to the molar amount of fully saturated material, when this would fill the container completely in the form of a single crystal (hereinafter: the theoretical molar amount). This molar amount can be calculated from the density of the fully saturated compound and the container volume.

In practice, it is not always desirable to reach the theoretical maximum ammonia storage capacity, since the desorption of ammonia is easier when there is some porosity left, i.e. the density of the container content does not quite correspond to the single crystal density of the fully saturated material. A density corresponding to at least about 90% and less or equal to about 98% of the theoretical maximum ammonia capacity is a desirable range. Surprisingly, even with such high densities, a sufficient desorption of ammonia can be achieved.

The material in the container is saturated to such a degree that the bulk volume of the partially saturated storage material under ambient pressure is approximately equal to the container volume, before it is then further saturated with ammonia to the desired saturation degree. The terms "partial saturation" or "partially saturated", as used in the context of the present invention, relate to a partially saturated material (salt) that completely fills a given container volume.

The further saturation can be conducted until an ammonia storage capacity of about 75% or higher, e.g. about 80%, about 85%, about 90%, about 95%, about 97%, about 98% or more than about 98% of the theoretical maximum ammonia storage capacity is achieved.

A storage capacity (which is related to the bulk density) of more than about 75% of the theoretical maximum storage capacity (corresponding to about 75% of the single crystal density) is higher than what may be obtained by hexagonal closest packing of spherical grains.

A desired storage capacity of less then the theoretical storage capacity can either be achieved by not fully saturating a molar amount corresponding to the theoretical molar amount or by employing a molar amount of material which corresponds to less than the theoretical amount and saturating it completely.

The degree of saturation of the material is about 75% or higher, e.g. about 80% or about 85% or about 90% or about 95% or about 97% or about 98% or more than about 98% when the theoretical molar amount is used. When less then the theoretical amount is used the degree of saturation is higher than about 75% in order to still achieve an ammonia storage capacity of 75% of the theoretical maximum or higher. Most desirably, a degree of saturation higher than about 90% is utilized to enable the best usage of the absorber material and to increase the ammonia storage capacity. When about 75% of the theoretical amount of the material is used, the degree of saturation is about 100% to achieve the necessary storage capacity.

The degree of saturation and the ammonia storage capacity are related to each other according to the following formula:

$$C=DZ$$

where the ammonia storage capacity, C, is expressed in g $NH_3$/L of container volume; the degree of saturation, D, is the dimensionless g $NH_3$ added/g $NH_3$ theoretically possible; and the storage material loading, Z, gives the g $NH_3$ theoretically possible/container volume (V).

The storage material loading is dependent on the molar amount of storage material used relative to the theoretical molar amount, n. If less than n moles are used, the relationship between storage capacity and degree of saturation is proportional, with Z being:

$$Z = g \text{ storage material}/V \cdot gNH3/g \text{ storage material}$$

If more than the theoretical molar amount, n, is used, the relationship between degree of saturation and storage capacity becomes more complicated as Z takes into account the container volume occupied by excess storage material which could otherwise have been used to store ammonia:

$$Z = g \text{ storage material}/V \cdot gNH3/g \text{ storage material} - B/V$$

where B is an overloading correction factor, $$B = (g \text{ storage material} - V \cdot \rho_{sat,mol} \cdot M) gNH3/g \text{ storage material}$$

where M is the ratio of molecular weights of the unsaturated to saturated material.

The process of further saturation and compaction (after the partially saturated material has filled the container volume completely) may be termed "self-compaction", since no compressing force is acting on the material.

To obtain a partially saturated material as defined above, a number of procedures can be followed.

In one embodiment, unsaturated granular or powdered material in the molar amount corresponding to about 75 to 100% of the theoretical molar amount is loaded into the container. The unsaturated granular or powdered material is preferably highly homogenous, i.e. the desired particle size distribution is narrow. Then ammonia is introduced into the container while the material in the container is agitated. This can for example be accomplished by shaking the container or rotating the container or both or any other movement of the container that will keep the storage material mobile inside the container. In this way the material in the container becomes more and more homogenously saturated and concomitantly expands, while being moved in the container. When there is enough saturation, the material will not move around in the container any more, but fills the container completely. This can be examined visually. At this time the agitation, e.g. shaking or rotating the container, is stopped. The mass of the partially saturated material in the container now resembles a porous solid block, which is at least partly coherent.

Thereafter the material, which now fills the container volume but still has voids or pores, may be saturated further until the desired ammonia storage capacity is reached without agitation.

An illustration of this embodiment is shown in FIG. 2.

In another embodiment, a molar amount of unsaturated raw material corresponding to about 75 to 100% of the theoretical molar amount is provided outside the container. Again, the unsaturated granular or powdered material is preferably highly homogenous, i.e. the desirable particle size distribution is narrow. This raw material is then uniformly partially saturated with ammonia. Since it may be spread out for the absorption of ammonia, agitation is not necessarily required. Often the material will be saturated in a rotating drum. The saturation will be continued until the bulk volume of the material will be approximately equal to the container volume.

The bulk volume can be determined via the bulk density. The following relation is used:

$$\rho_{bulk} = m_{stor.mat.}/V_{bulk} \rightarrow V_{bulk} = m_{stor.mat}/\rho_{bulk}$$

The bulk density $\rho_{bulk}$ decreases as the material becomes more saturated, i.e. the bulk volume increases inversely with the bulk density. A calibration curve of the bulk density against the degree of saturation can be established, and thus the bulk volume can be estimated via the ammonia consumption of the material. (The degree of saturation in turn can be estimated via the density ("single crystal density") ρ of the partially saturated material and the single crystal parameters or established directly by absorbing a controlled amount of ammonia).

The partially saturated material having the required bulk volume is then filled into the container and may be further saturated to the desired ammonia storage capacity without agitation.

In yet a further embodiment, the partial saturation of the raw material is accomplished by mixing two differently saturated materials, normally unsaturated material and fully saturated material, which gives a partially saturated material in the average.

Advantageously, the mean particle size of the unsaturated material and the fully saturated material is approximately the same, with a narrow particle size distribution, although this is not an absolute prerequisite.

This material is usually mixed outside of the container, e.g. in a rotating drum, and then filled into the container.

For the theoretical limit of reaching the maximum theoretical ammonia storage capacity (or single crystal density), the following holds:

The mixture of the two components must have the molar mass mentioned above, and the mixture must completely fill the container volume. Furthermore, the proportions of the two components must be such, that upon full saturation of the mixture the void in between the powder particles or granules is just filled.

The proportions of the components can be calculated as follows:

The space which is taken by the voids in the bulk material depends only on the form and the mass of the particles making up the bulk material, as long as it is poured as densely as possible. Therefore, the void volume can be determined by means of a single material of known density having the same powder or granule sizes and shapes as the mixture, e.g. $CaCl_2$, when $CaCl_2$ and $Ca(NH_3)_8Cl_2$ are used. The difference between the bulk volume and the single crystal volume (both can be calculated via the corresponding densities, as mentioned above) of a given molar amount is then the void volume of said molar amount, $V_{void}$.

The remaining space ($V_{s.cryst}$) in the container volume for the two components, unsaturated material and saturated material, each in single crystal form without voids, is then $V_{cont} - V_{void} = V_{s.cryst}$. This space is occupied by n moles of mixed material (n moles being the above-identified molar amount of the saturated material in single crystal form in the container volume), x moles unsaturated material and (n-x) moles saturated material.

Since the molecular weights of the two components are know, the densities which are also known, can be expressed in moles/$cm^3$ (for unsaturated component: $a_{uns.\cdot moles/cm^3}$ ($\rho_{uns.mol}$), for the saturated component: $b_{sat.}$ moles/$cm^3$ ($\rho_{sat.mol}$). The combined single crystal volume of both components ($V_{s.crys}$) is composed of the single crystal volume of the unsaturated compound ($V_{s.crys.uns}$) and the saturated compound ($V_{s.cry.sat}$).

Thus $(V_{s.crys}) = (V_{s.crys.uns}) + (V_{s.crys.sat})$.

For the unsaturated compound: x moles/
$V_{s.crys.uns} = \rho_{uns.mol}$ or $V_{s.crys.uns} = x$ moles/$\rho_{uns.mol}$ For the saturated compound: (n-x) moles/
$V_{s.crys.sat} = \rho_{sat.mol}$ or or $V_{s.crys.sat} = (V_{s.crys} - V_{s.crys.uns}) = (n-x)$ moles/$\rho_{sat.mol}$ After addition of the two equations one gets:

$V_{s.crys} = x$ moles/$\rho_{uns.mol} + (n-x)$ moles/$\rho_{sat.mol}$

Multiplied with $\rho_{uns.mol} \cdot \rho_{sat.mol}$ this yields:

$\rho_{uns.mol} \rho_{sat.mol} V_{s.crys} = x$ moles$\cdot \rho_{sat.mol} + (n-x)$ moles$\cdot \rho_{uns.mol}$ $\rho_{uns.mol} \rho_{sat.mol} V_{s.crys} = x$ moles$\cdot \rho_{sat.mol} + n \cdot \rho_{uns.mol} + x$ moles$\cdot \rho_{uns.mol}$ $\rho_{uns.mol} \rho_{sat.mol} V_{s.crys} - n \cdot \rho_{uns.mol} = x$ moles$(\rho_{sat.mol} + \rho_{uns.mol})$ $x$ moles $= (\rho_{uns.mol} \rho_{sat.mol} V_{s.crys} - n \cdot \rho_{uns.mol})/(\rho_{sat.mol} + \rho_{uns.mol})$ or $x$ moles $= \rho_{uns.mol}(\rho_{sat.mol} V_{s.crys} - n)/(\rho_{sat.mol} + \rho_{uns.mol})$ In other words, x moles unsaturated material, calculated as shown above, have to be mixed with (n-x) moles saturated material.

In practice, it is usually desirable to obtain less than the theoretical maximum ammonia storage capacity. In this case, either the theoretical molar amount will be used and the final saturation will not be complete, or less of the unsaturated salt will be used and the final saturation will be a complete saturation. In the former case, the ammonia storage capacity can be calculated from the amount of ammonia up-take of the mixture, while in the latter case, the ammonia storage capacity can be calculated from the amount of unsaturated salt used.

Figure 3:
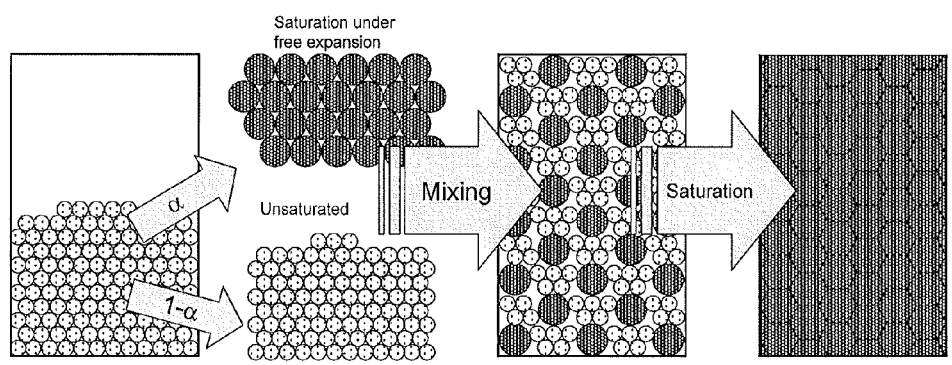
FIG. 3 is a schematic representation of saturating an ammonia storage material when a mixture of the saturated and unsaturated material is used as a starting material.

This embodiment is illustrated in FIG. 3.

In one embodiment, absorption heat is removed actively from the container while partially or fully saturating the storage material. The simplest way to do this is to cool the exterior of the container. In one embodiment, this can be accomplished by directing a flow of cooling air around the container. In another embodiment, water can be sprayed onto the outside surface of the container. In yet another embodiment, the container is totally or partially immersed in a cooling substance during saturation. It is advantageous to actively remove the absorption heat to decrease the total saturation time.

Figure 4:
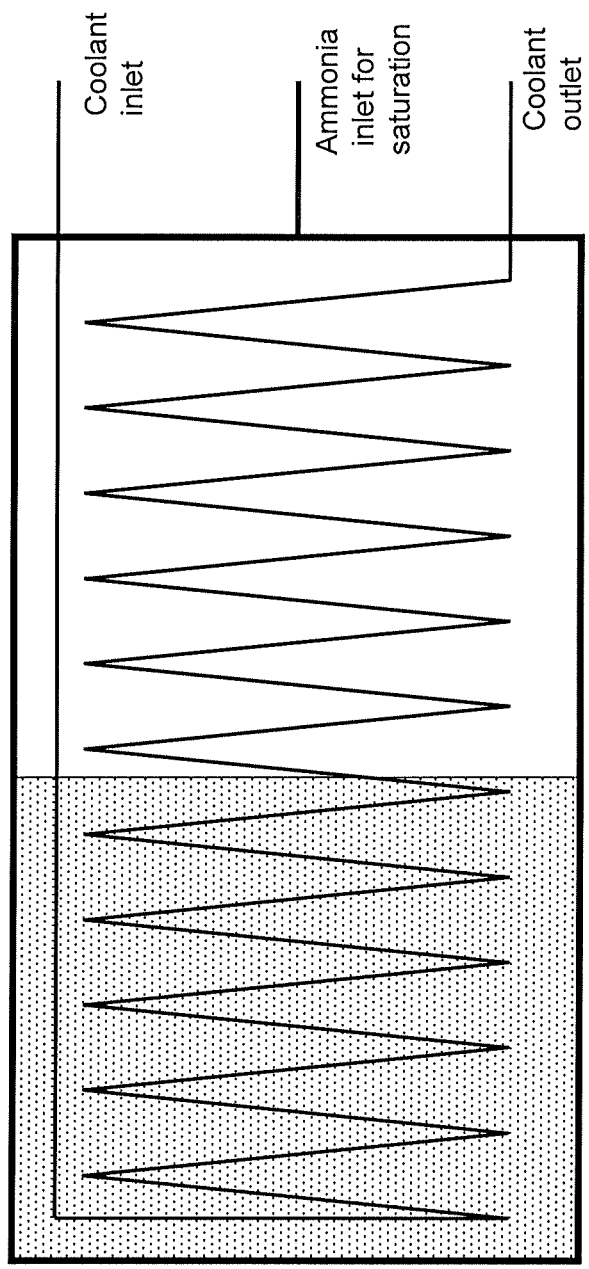
FIG. 4 shows a cooling element in a container partially filled with unsaturated ammonia storage material.

In another embodiment, a cooling element is placed inside the container in thermal contact with the storage material. It is advantageous to mechanically shape the cooling element to have uniform thermal distances between salt and cooling element throughout the container. The cooling element may be in the form of a tube in which a fluid with a temperature lower than the storage material can flow thereby removing the absorption heat from the storage material during partial or further saturation. For a cylindrical container, it is advantageous to have a cylindrical tube or coil shaped cooling element which is placed coaxially into the container. The cooling element can be in the form of a tube guiding a coolant (gas, liquid). In one variation of the embodiment, the cooling element is formed and coolant applied such that cooling is accelerated in the part of the container away from the ammonia source. This is advantageous because saturation of the container then starts away from the ammonia source and ends at the ammonia source. A simplified 2D drawing of such an embodiment is shown in FIG. 4. FIG. 4 shows a unit partially filled with a suitable amount of salt. The salt (powder or granules) has an average saturation degree (density) that results in the salt occupying only about half of the container.

Figure 5:
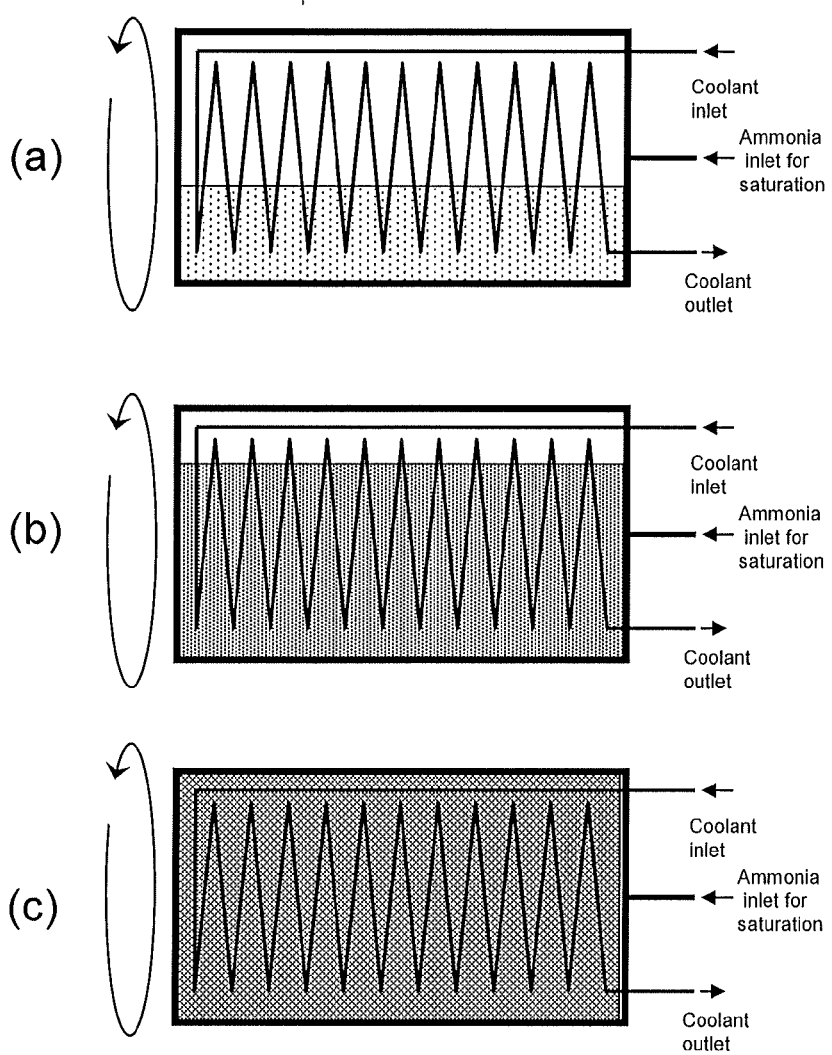
FIG. 5 shows the gradual, partial saturation with ammonia during the rotation of the container of FIG. 4.

FIG. 5 shows a procedure of how the unit from FIG. 4 would be partially saturated by rotating the unit under a supply pressure of ammonia. The slow expansion of the material during the partial saturation makes the material gradually fill the unit homogeneously and at (c), the material fills the unit completely as a partially saturated and porous body. Optionally, one can send coolant fluid through the internal coil to speed up the partial saturation process. However, in the rotational partial saturation process, this may not be necessary as the warm material that absorbs ammonia comes into contact with the external wall of the container, which dissipates the heat to the surroundings. The internal coil for removing heat of absorption becomes more important in the final saturation step where the material no longer moves around in the container.

Figure 6:
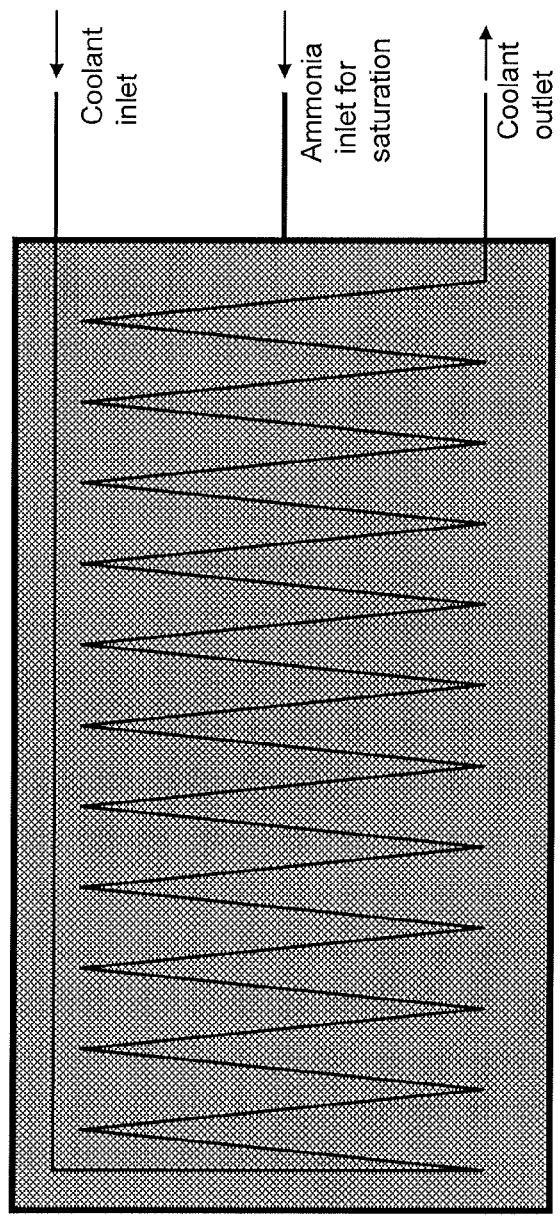
FIG. 6 shows the container of FIG. 4 completely filled with partially saturated ammonia storage material.

FIG. 6 shows the container after the steps in FIG. 5. At this point in the process, the unit is ready for complete saturation. If cooling fluid is applied to speed up the saturation process, its application can also be used to control how the saturation proceeds. The cooling fluid enters the unit such that it quite rapidly reaches the far end of the container, i.e. reaches the end furthest away from the ammonia inlet. In FIG. 6, a preferred embodiment is shown where the cooling fluid enters and exits in the same end as the ammonia inlet (which may be advantageous in terms of access to the inlet ports), but the coolant fluid rapidly reaches the far end of the container and will start to be warmed up by absorption taking place in the far end.

Figure 7:
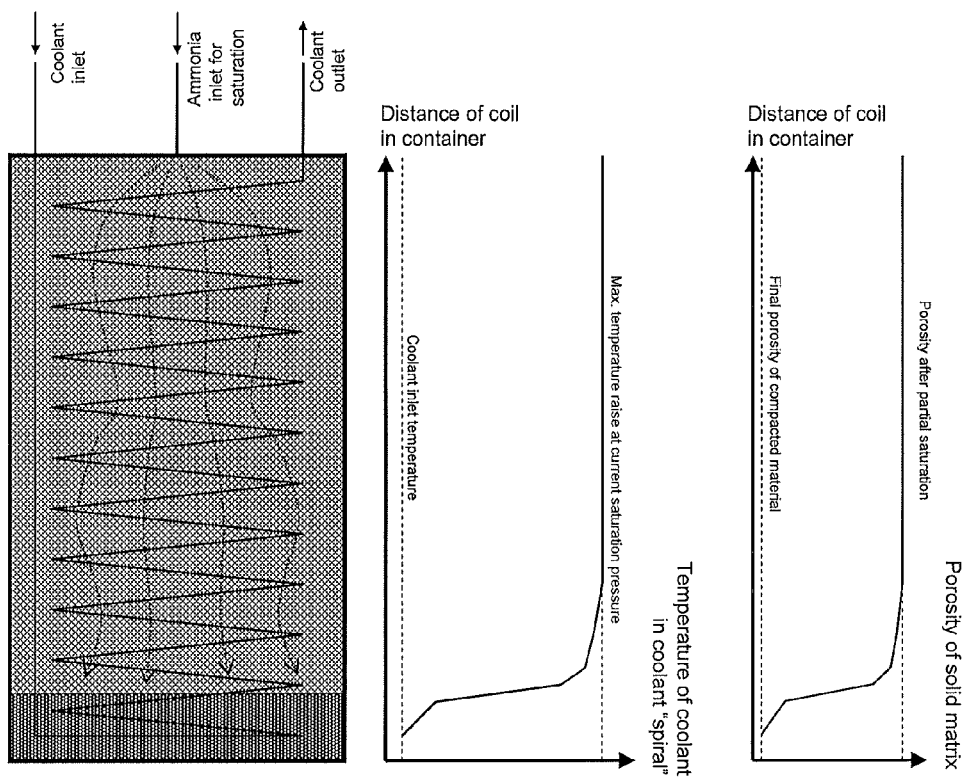
FIGS. 7, 8, 9 and 10 show different stages of fully saturating the partially saturated ammonia storage material of FIG. 6.
Figure 8:
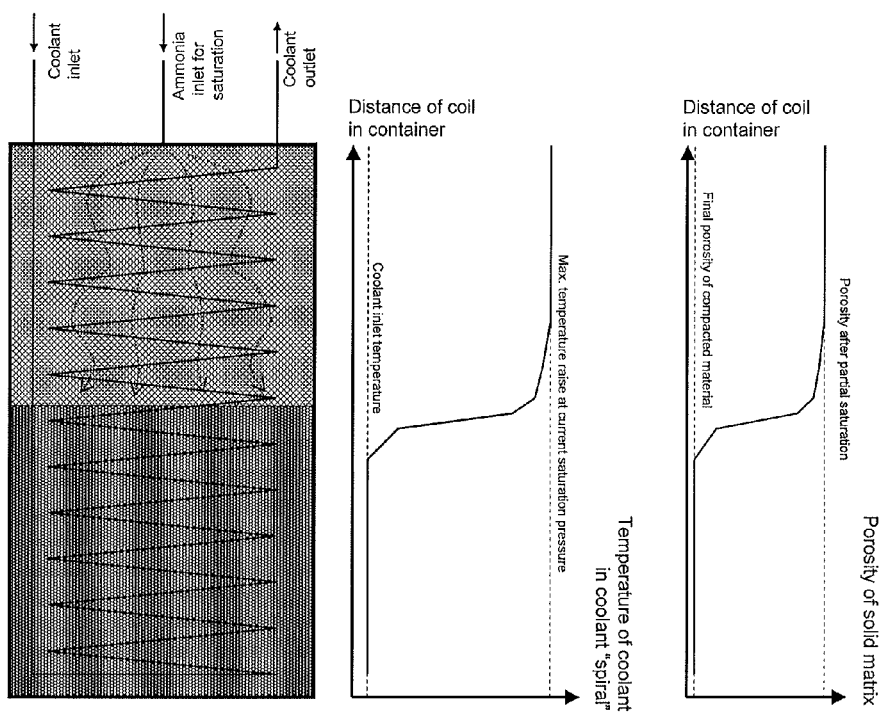
Figure 9:
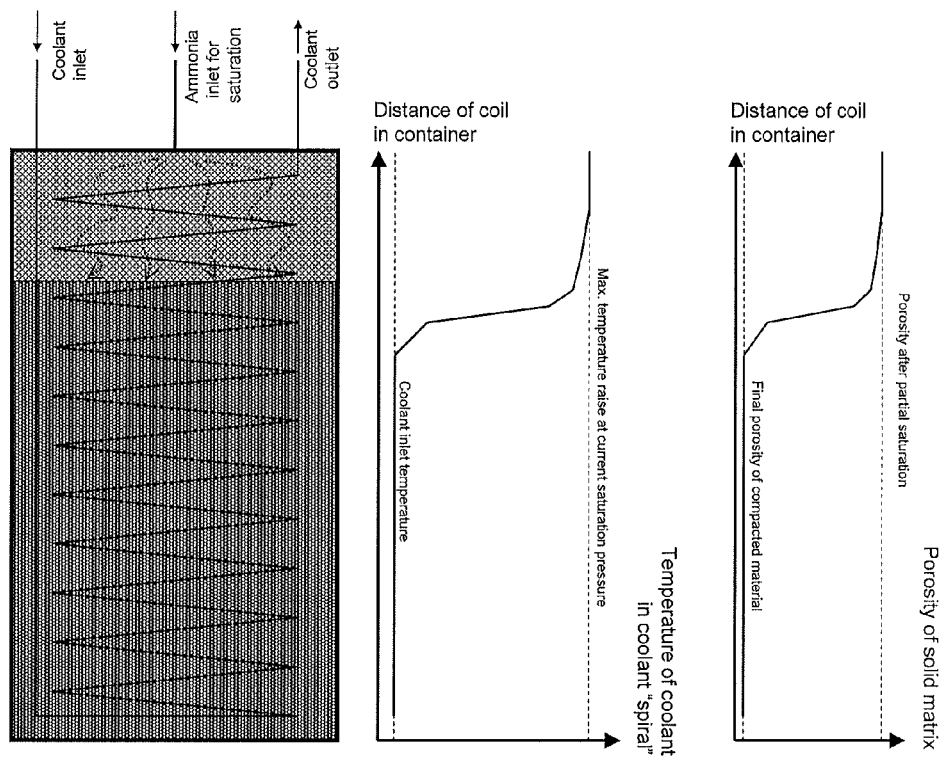
Figure 10:
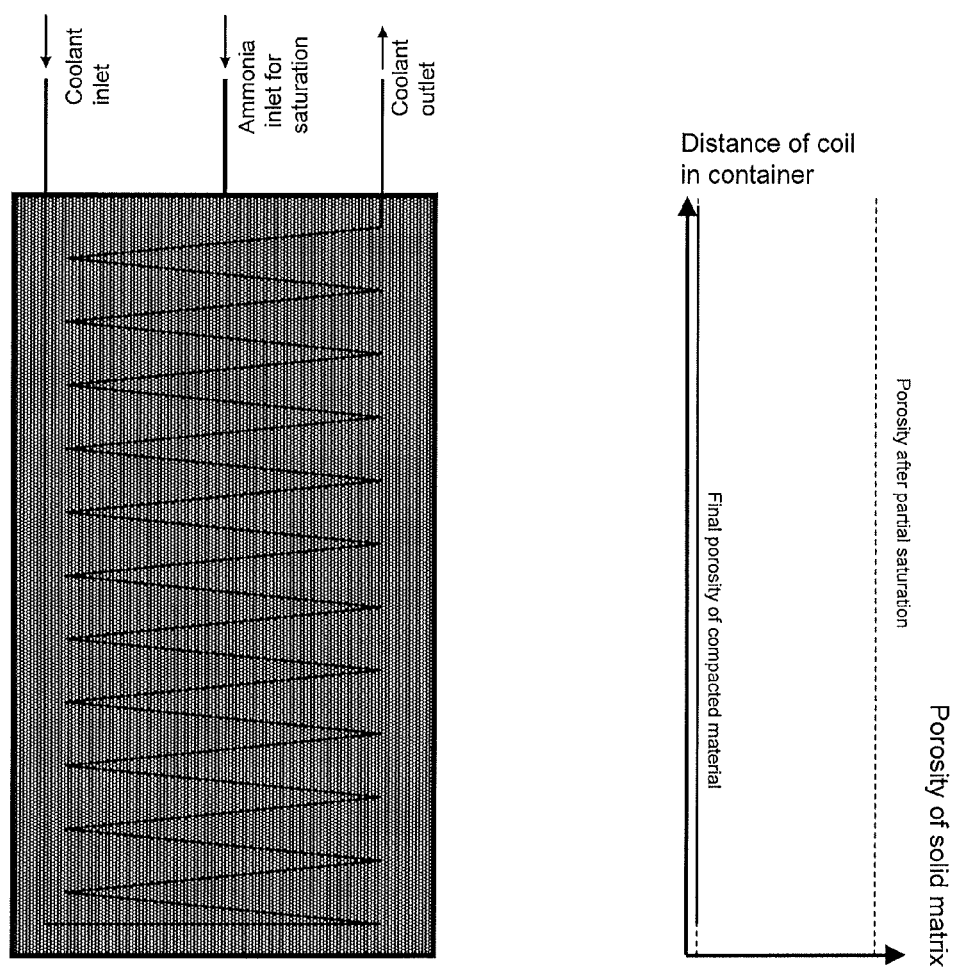

This is then further illustrated in FIGS. 7, 8, 9 and 10, where the deliberate delivery path of the coolant fluid will speed up the saturation process in the far end of the container and then gradually saturate and compact the material upwards. In this way, a good flow distribution for ammonia from the inlet to the moving front of compacted storage material is maintained at all times. The graphs next to the schematic drawings of the interior of the container in FIGS. 7 to 10 illustrate the evolution of coolant temperature and porosity in the container. In FIG. 7, the saturation has not yet progressed very far, and the heating of the coolant takes place around the zone between saturated (dark shading) and partially saturated material (lighter shading). Similarly, the material around the coolant spiral becomes quite dense in the saturated zone, which can be seen on the graph illustrating the evolution of material porosity. FIG. 8 shows an intermediate step, and FIG. 9 shows a situation close to full saturation. In FIG. 9, most of the unit is cold because the lower part is saturated and does not evolve heat (from absorption), and therefore the coolant only becomes warmer towards the top. Below the absorption front the material is now dense—as shown on the curve for porosity. Finally, the content of the unit in FIG. 10 is homogeneously self-compacted, and in the very final stage of saturation, only the top part of the unit absorbs the final quantities of ammonia.

The present invention of a partial saturation and final saturation step allows the controlled evolution of self-compaction in the unit, which at the same time enables the continuous inlet flow of ammonia since the entrance remains porous until the final stage of saturation.

This could also be achieved—only not as efficiently—without the internal coolant flow. If the unit was covered by an insulation material around the upper part of the unit, then compaction would mostly occur where the heat could be dissipated to the external wall of the container. At the end, the top part of the container should be exposed to the surroundings, so the final step of saturation could occur.

One embodiment further comprises to release ammonia after the final saturation step. In this embodiment the cooling element may also act as a heating element if e.g. a warm substance is passed through the tube. This can be advantageously used as a heating source for a subsequent ammonia release from the container. Alternatively, electric current can be applied to the cooling element, if it is made from an electrical conducting material. When the cooling spiral is used for heating, the entrance of the warm liquid/fluid should be reversed, i.e. that the top part of the container should receive the warm fluid so that the desorption pressure is raised close to the ammonia gas connection tube (with also serves as the inlet during saturation).

The desorption of ammonia can also be effected by applying a vacuum to the container thereby creating a driving force for ammonia desorption without heating the container for obtaining an ammonia pressure above atmospheric pressure.

During use, the saturated containers are degassed for releasing the ammonia stored therein, resulting in containers filled with storage material void of ammonia. A special advantage of all embodiments and methods above is that the material forms a mechanically stable matrix inside the container even after releasing the ammonia. This facilitates re-saturation of the containers simply by connecting them to an ammonia source. If a unit being re-saturated with ammonia is a unit that has the internal spiral for cooling/heating, then the re-saturation would be carried out according to the present invention just like the last step of the first filling (i.e. with cooling fluid entering as in FIGS. 7 to 10 to accelerate saturation while allowing for good ammonia gas transport down through the unit where the material is still porous).

Another aspect of the present invention is a container of an arbitrary shape comprising a container volume essentially filled with an ammonia storage material, which reversibly absorbs and desorbs ammonia, with a degree of saturation under ambient pressure corresponding to at least 75% of theoretical maximum ammonia storage capacity of said ammonia storage material in said container, wherein said ammonia storage material is not in a granular or powder form.

Yet another aspect of the present invention is a container of an arbitrary shape comprising a container volume essentially filled with a partially saturated ammonia storage material, which reversibly absorbs and desorbs ammonia, said filled container being obtainable by a) providing an unsaturated granular ammonia storage material void of ammonia in a molar amount, which is equal to at least about 75% of the molar amount of fully saturated material, when this would fill the container volume completely in form of a single crystal, outside the container;

b) optionally filling the container with the material provided in a);

c) obtaining a granular ammonia storage material which is partially saturated with ammonia to such a degree that its bulk volume essentially equals the container volume, from the granular ammonia storage material provided in a) or b) under ambient pressure, with the proviso that the material is agitated when said obtaining is accomplished inside the container;

d) completely filling the container with the partially saturated material, if obtained outside the container.

EXAMPLES

Example 1

97.7 g of $CaCl_2$ is placed in a container with a volume of 195 ml. The amount of $CaCl_2$ is chosen such that when the salt is fully saturated with ammonia it forms a dense material inside the container. A pressure of 1.7 bar of ammonia is applied to the container. After 70 minutes the material exactly fills the container with 17.7 g of ammonia absorbed. During the saturation process, the unit is shaken and rotated to distribute the material. At this point in time (e.g. t=t3 in FIG. 2), the material is still far from saturated but it is ready for the final self-compaction step.

Example 2

131.1 g of $SrCl_2$ is placed in a container with a volume 195 ml. Again, 1.7 bar of ammonia is applied, and after 95 minutes the material fills the container with 32.8 g ammonia absorbed.

Example 3

In some cases it is desirable to mix the salt with other substances. As an example, 130.1 g $SrCl_2$ mixed with 10.0 g aluminum powder is saturated in a container with volume 195 ml under 1.7 bar of ammonia. After 100 minutes the material fills the container with an ammonia content of 25.9 g In Examples 1-3 above, the container with the material therein is mechanically mixed during saturation to ensure that the degree of partial saturation is homogeneously distributed inside the container.

Example 4

As an example of partial saturation by mixing saturated and unsaturated salt, a container with volume 7846 ml is filled with a mixture 3509.5 g unsaturated $CaCl_2$, 921.1 g saturated $Ca(NH_3)_8Cl_2$ and 401.4 g aluminum powder. The mixture exactly fills the container. After the container is fully saturated with ammonia, the material forms a dense body in the container with a density of 96% of the theoretical density for the material. No deformation of the container is observed.

Example 5

As an example of partial saturation inside the container a cylindrical container with a volume 5.20 l is filled with 3500 g $SrCl_2$ and 350 g aluminum powder. A pressure of 3 bar ammonia is applied to the container while it is continuously rotated horizontally around the symmetry axis. After 4 hours the material fills the container in a partially saturated state.

After full saturation the material fills the container as a dense body with a density of 96% of the theoretical density for the material.

Example 6

As an example of cooling the container actively during saturation, a container of 5.2 l—prepared with $CaCl_2$—is fully saturated with ammonia to an almost dense material. During saturation air is blown past the container with a fan. The saturation time is reduced by 25% compared to saturation with no active cooling.

Example 7

In another example, a 275 ml container is prepared with $CaCl_2$ and saturated while sitting in an ice bath at 0° C. The saturation time is reduced by about 90% compared to saturation without cooling.

Example 8

As an example of internal cooling, a spiral cooling element is placed inside the container during saturation. The cooling element is in the form of a coiled stainless steel tube. The total length of the tube is 5 meters and the diameter of the tube is 6 mm. By flowing water at a temperature of 20° C. through the tube as coolant, the saturation time is reduced by more than 60%. A special advantage is obtained when the cooling fluid enters the cooling coil opposite the entrance point of the ammonia source. In this case the far end of the container saturates first, thus saturating and self-compacting the container gradually from one end to the other. This results in good ammonia transport during the entire saturation process. During self-compaction, the porosity gradually reduces to almost 0%, and it is therefore advantageous if some porosity is present close to the ammonia entrance point during the last portion of the saturation process (cf. FIGS. 8 to 10).

Example 9

As an example of re-saturation, a cylindrical 7.3 l container is first saturated with ammonia using initial rotation, followed by as complete a degassing of the ammonia as possible. The container is then connected to an ammonia supply held at 3 bar. When the re-absorption process terminated, the unit contains an amount of ammonia corresponding to more than 95% of the amount absorbed from the initial saturation. No mechanical deformations are observed. The re-saturation could also be speeded up by using the active cooling described previously.

Example 10

As an example of adding a material with higher thermal conductivity than the storage material, the storage material is mixed with flakes of aluminium or graphite with an amount corresponding to 5% of the cartridge volume. The material was first partly saturated under rotation to completely fill the cartridge volume followed by stationary saturation to complete saturation. In both cases the thermal conductivity was enhanced from 0.5 W/m K in the pure storage material to about 2.5 W/m K in the material containing additive.

All documents cited herein, e.g. patents, patent applications and journal articles, are herein enclosed by reference.

The invention claimed is:

1. A method for obtaining an ammonia storage material, which can reversibly absorb and desorb ammonia, wherein the material can be in unsaturated form void of ammonia, partially saturated form wherein the average saturation with ammonia is less than the saturation obtained when the material has absorbed ammonia in the maximum theoretical amount, and fully saturated form wherein the material has absorbed ammonia in the maximum theoretical amount, in a container comprising a container volume with a degree of saturation with ammonia corresponding to at least about 75% of the theoretical maximum ammonia storage capacity of said ammonia storage material in said container volume the method comprising:

a) providing said container comprising said container volume, wherein said container volume is filled with a granular or powdered form or a coherent or semi-coherent porous form of said partially saturated ammonia storage material in a molar amount that corresponds to at least about 75% of the molar amount of the fully saturated material, which would fill the container volume completely in form of a single crystal; said partial saturation corresponding to a saturation of the storage material with ammonia to such a degree that the bulk volume of the partially saturated storage material under ambient pressure essentially equals the container volume;

b) further saturating said partially saturated ammonia storage material with ammonia to a desired degree of saturation corresponding to at least about 75% of the theoretical maximum ammonia storage capacity of said ammonia storage material in said container volume without agitation.

2. The method of claim 1 wherein said partially saturated ammonia storage material is in admixture with an additive not capable of storing ammonia and having a thermal conductivity higher than that of said ammonia storage material at a temperature of from at least −45° C. to 250° C.

3. The method of claim 1 wherein said providing of said container in step a) comprises:
   a) providing a molar amount of an unsaturated granular or powdered ammonia storage material void of ammonia, which is equal to at least about 75% of said molar amount of the fully saturated material, outside the container;
   b) optionally filling the material provided in a') into the container;
   c) obtaining a granular or powdered ammonia storage material which is partially saturated with ammonia to such a degree that its bulk volume essentially equals the container volume under ambient pressure, from the granular or powdered ammonia storage material provided in a') or b'), the material being agitated when said obtaining is accomplished inside the container;
   d) filling the container volume completely with the partially saturated material, if obtained outside the container,
   e) and optionally further supplying ammonia with agitation, until the partially saturated material is a coherent or semi-coherent porous material.

4. The method of claim 3 wherein said unsaturated ammonia storage material is in admixture with an additive not capable of storing ammonia and having a thermal conductivity higher than that of said ammonia storage material.

5. The method of claim 3 wherein said obtaining of said partially saturated material is accomplished outside the container.

6. The method of claim 3 wherein said obtaining of said partially saturated material is accomplished within said container while agitating the material.

7. The method of claim 1, wherein said obtaining of said partially saturated material is accomplished by partially saturating all of the molar amount of the unsaturated granular or powdered ammonia storage material void of ammonia, which is equal to about 75 to about 100% of the molar amount of the fully saturated material, when this would fill the container volume completely in form of a single crystal, with ammonia.

8. The method claim of 1 wherein said obtaining of said partially saturated material is accomplished by mixing unsaturated or partially saturated material and a differently partially saturated material or fully saturated material.

9. The method of claim 6 wherein said agitating is accomplished by shaking, rotating or both or any other movement of the container that will keep the storage material mobile inside the container.

10. The method claim of 1 further comprising actively removing absorption heat while partially or further saturating said storage material.

11. The method of claim 10 wherein said actively removing heat is achieved by cooling the exterior of the container.

12. The method of claim 10 wherein said actively removing heat is achieved by placing a cooling element inside the container in thermal contact with said storage material.

13. The method of claim 10 wherein the container is put in fluid communication with an ammonia source in one end and the cooling fluid enters the coil in the opposite end thereby improving cooling and accelerating saturation of the material in the opposite end from where ammonia enters the container and gradually saturating the material from that end towards the ammonia entrance point.

14. The method of claim 1 wherein the partially saturated material is further saturated with ammonia to the degree of saturation which corresponds to an ammonia storage capacity or density of more than 75% of the theoretical ammonia storage capacity or single crystal density of the fully saturated material in said container volume.

15. The method of claim 14 wherein the partially saturated material is further saturated with ammonia to a degree of saturation which corresponds to the saturation degree more than 90% of the fully saturated material.

16. The method of claim 1, further comprising releasing ammonia by desorption after further saturating said partially saturated material with ammonia to the desired ammonia storage capacity in said container volume without agitation.

17. The method of claim 12 wherein the cooling element after saturation is also used as a heating element for desorbing ammonia from the storage material.

18. The method according to claim 1, further comprising re-saturating the ammonia storage material in said container partly or fully depleted of ammonia by placing the container in fluid communication with an ammonia source.

19. A method for obtaining an ammonia storage material, which can reversibly absorb and desorb ammonia, wherein the material can be in unsaturated form void of ammonia, partially saturated form wherein the average saturation with ammonia is less than the saturation obtained when the material has absorbed ammonia in the maximum theoretical amount, and fully saturated form wherein the material has absorbed ammonia in the maximum theoretical amount, in a container comprising a container volume, comprising
   a) providing said container;
   b) providing an unsaturated granular or powdered ammonia storage material void of ammonia in a molar amount, which is equal to at least about 75% the molar amount of fully saturated material, when this would fill the container volume completely in form of a single crystal, outside the container;
   c) optionally filling the material provided in b) into the container;
   d) obtaining a granular or powdered ammonia storage material which is partially saturated with ammonia to such a degree that its bulk volume essentially equals the container volume, from the granular or powdered ammonia storage material provided in b) or c) under ambient pressure, the material being agitated when said obtaining is accomplished inside the container;
   e) filling the container volume completely with the partially saturated material, if obtained outside the container,
   f) and optionally further supplying ammonia with agitation, until the partially saturated material is a coherent or semi-coherent porous material.

20. The method of claim 13 wherein the cooling element after saturation is also used as a heating element for desorbing ammonia from the storage material.

* * * * *